(12) United States Patent
Kirkegaard (10) Patent No.: US 11,565,484 B2
(45) Date of Patent: Jan. 31, 2023

(54) SYSTEM AND METHOD FOR THE MANUFACTURE OF AN ARTICLE

(71) Applicant: LM WP PATENT HOLDING A/S, Kolding (DK)

(72) Inventor: Daniel Schlichting Kirkegaard, Fredericia (DK)

(73) Assignee: LM WP PATENT HOLDING A/S, Kolding (DK)

(*) Notice: Subject to any disclaimer, the term of this patent is extended or adjusted under 35 U.S.C. 154(b) by 613 days.

(21) Appl. No.: 14/766,648

(22) PCT Filed: Feb. 7, 2014

(86) PCT No.: PCT/EP2014/052439
§ 371 (c)(1),
(2) Date: Aug. 7, 2015

(87) PCT Pub. No.: WO2014/122268
PCT Pub. Date: Aug. 14, 2014

(65) Prior Publication Data
US 2015/0375462 A1    Dec. 31, 2015

(30) Foreign Application Priority Data
Feb. 8, 2013    (EP) .................................... 13154588

(51) Int. Cl.
*B29C 70/38*    (2006.01)
*F03D 1/06*    (2006.01)
(Continued)

(52) U.S. Cl.
CPC ............ *B29C 70/388* (2013.01); *B29C 70/38* (2013.01); *B29C 70/386* (2013.01);
(Continued)

(58) Field of Classification Search
CPC ..... B29C 70/38; B29C 70/382; B29C 70/384; B29C 70/386; B29C 70/388; B29C 70/50; B29C 70/502
See application file for complete search history.

(56) References Cited

U.S. PATENT DOCUMENTS 3,810,805 A * 5/1974 Goldsworthy et al. ...................... B29C 70/388
156/361
3,970,831 A * 7/1976 Hegyi ...................... B25J 9/026
318/568.1

(Continued)

FOREIGN PATENT DOCUMENTS

| FR | 2 950 285 A1 | 3/2011 |
| WO | 2010/055062 A1 | 5/2010 |
| WO | 2010129492 A2 | 11/2010 |

OTHER PUBLICATIONS

International Search Report dated May 6, 2014 issued in International Application No. PCT/EP2014/052439.

*Primary Examiner* — Andrew D Graham
(74) *Attorney, Agent, or Firm* — Nath, Goldberg & Meyer; Jerald L. Meyer; Tanya E. Harkins (57) ABSTRACT

A method of manufacturing a fibre-composite article is described, wherein a layer of fibre material is applied from a layup head to a mould along a layup path. The angle at which the fibre material is dispensed from the layup head is rotated relative to the angle of orientation of the layup path, to minimise the effects of gravity on the alignment of the fibre layer in the mould. The fibre-composite article is preferably a section of a blade for a wind turbine.

19 Claims, 5 Drawing Sheets

(51) Int. Cl.
*B29L 31/08* (2006.01)
*B29K 105/08* (2006.01)

(52) U.S. Cl.
CPC ........ *F03D 1/0675* (2013.01); *B29K 2105/08* (2013.01); *B29L 2031/085* (2013.01); *Y02E 10/72* (2013.01); *Y02P 70/50* (2015.11)

(56) References Cited

U.S. PATENT DOCUMENTS

| | | | | | |
|---|---|---|---|---|---|
| 4,200,271 | A * | 4/1980 | August | B29C 70/386 | 156/500 |
| 4,534,813 | A * | 8/1985 | Williamson | B29C 33/3835 | 156/191 |
| 4,541,886 | A * | 9/1985 | Marlow | B29C 70/386 | 156/230 |
| 4,574,029 | A * | 3/1986 | Murray | B29C 70/386 | 156/358 |
| 4,588,466 | A * | 5/1986 | Eaton | B29C 70/386 | 156/235 |
| 4,591,402 | A * | 5/1986 | Evans | B29C 70/388 | 156/350 |
| 4,696,707 | A * | 9/1987 | Lewis | B29C 70/386 | 156/350 |
| 4,750,965 | A * | 6/1988 | Pippel | B29C 70/388 | 156/361 |
| 4,842,684 | A * | 6/1989 | Tillement | B29C 41/12 | 156/247 |
| 4,915,771 | A * | 4/1990 | O'Brien | B29C 70/388 | 156/574 |
| 5,015,326 | A * | 5/1991 | Frank | B29C 70/388 | 156/353 |
| 5,041,179 | A * | 8/1991 | Shinno | B29C 70/386 | 156/361 |
| 5,074,948 | A * | 12/1991 | Greffioz | B29C 70/388 | 156/523 |
| 5,117,348 | A * | 5/1992 | Romero | B29C 70/388 | 156/350 |
| 5,431,749 | A * | 7/1995 | Messner | B29C 70/388 | 156/358 |
| 5,476,627 | A * | 12/1995 | Black | B29B 15/122 | 156/291 |
| 5,580,413 | A * | 12/1996 | Assink | B29C 70/388 | 156/361 |
| 7,326,312 | B1 * | 2/2008 | Rust | B29C 70/388 | 156/234 |
| 9,308,692 | B2 * | 4/2016 | Pedigo | B29C 70/38 | |
| 9,895,849 | B2 * | 2/2018 | Smith | B29B 11/16 | |
| 2005/0023414 | A1 * | 2/2005 | Braun | B29C 70/32 | 244/120 |
| 2005/0061422 | A1 * | 3/2005 | Martin | B29C 70/388 | 156/230 |
| 2006/0073309 | A1 * | 4/2006 | Hogg | B29C 70/386 | 428/156 |
| 2006/0090856 | A1 * | 5/2006 | Nelson | B29C 70/386 | 156/510 |
| 2006/0162143 | A1 * | 7/2006 | Nelson | B29C 70/202 | 29/431 |
| 2007/0107189 | A1 * | 5/2007 | Prichard | B29C 33/307 | 29/448 |
| 2008/0169579 | A1 * | 7/2008 | Mueller-Hummel | B29C 70/386 | 264/40.1 |
| 2008/0196825 | A1 * | 8/2008 | Hamlyn | B29C 70/382 | 156/232 |
| 2008/0216963 | A1 * | 9/2008 | Hamlyn | B26D 1/085 | 156/511 |
| 2009/0020219 | A1 * | 1/2009 | Lopez-Carrasco Picado | B29C 70/386 | 156/245 |
| 2009/0143207 | A1 * | 6/2009 | Wampler | B23C 1/002 | 483/51 |
| 2009/0218723 | A1 * | 9/2009 | Karem | B29C 33/40 | 264/219 |
| 2009/0229760 | A1 * | 9/2009 | Hamlyn | B29C 70/384 | 156/433 |
| 2010/0252182 | A1 * | 10/2010 | Rettig | B29C 53/588 | 156/189 |
| 2010/0252183 | A1 * | 10/2010 | Munaux | B29C 70/388 | 156/202 |
| 2010/0285265 | A1 * | 11/2010 | Shinoda | B29B 11/16 | 428/80 |
| 2010/0286808 | A1 * | 11/2010 | Wyatt | B29C 70/386 | 700/97 |
| 2011/0014429 | A1 * | 1/2011 | Hogg | B29C 70/386 | 428/161 |
| 2012/0012242 | A1 * | 1/2012 | Blonigen | B29C 70/38 | 156/180 |
| 2012/0060755 | A1 * | 3/2012 | De Mattia | B29C 70/386 | 118/308 |
| 2012/0073749 | A1 * | 3/2012 | Naumann | B29C 70/38 | 156/322 |
| 2012/0186730 | A1 * | 7/2012 | Shindo | B29C 70/38 | 156/160 |
| 2012/0301681 | A1 * | 11/2012 | Sevilla | B29C 70/386 | 428/179 |
| 2013/0036922 | A1 * | 2/2013 | Stewart | B29C 70/38 | 100/35 |
| 2013/0118770 | A1 * | 5/2013 | De Jong | B29C 70/386 | 174/2 |
| 2013/0142898 | A1 * | 6/2013 | Vaniglia | B29C 70/386 | 425/150 |
| 2013/0194415 | A1 * | 8/2013 | Abe | G01C 11/02 | 348/92 |
| 2015/0314583 | A1 * | 11/2015 | Jess | B29C 31/085 | 156/324.4 |

\* cited by examiner

SYSTEM AND METHOD FOR THE MANUFACTURE OF AN ARTICLE

This is a National Phase Application filed under 35 U.S.C. 371 as a national stage of PCT/EP2014/052439, filed Feb. 7, 2014, an application claiming the benefit of European Application No. 13154588.1, filed Feb. 8, 2013, the content of each of which is hereby incorporated by reference in its entirety.

FIELD OF THE INVENTION

The present invention relates to a system and method for the manufacture of an article, in particular a fibre-composite article in a mould, preferably at least a portion of a blade for a wind turbine.

BACKGROUND OF THE INVENTION

The manufacture of fibre-composite articles generally involves the layup of fibre-composite material in a shaped mould, the fibre-composite material normally applied as strips of a continuous layer. A resin can then be applied to the fibre-composite material in the mould which is subsequently cured to solidify the fibre-composite material into the moulded article. The moulded article can be then removed from the mould for additional processing or machining, with the mould prepared for the layup and curing of the next article in the mould.

Traditionally, the layup material is manually applied to the surface of the mould. However, as some fibre-composite articles are of considerable length, for example modern wind turbine blades can be in excess of 40 metres in length, such manual layup results in a considerable cycle time for the manufacture of a single article.

In an effort to reduce the manufacturing time for such articles, fibre-composite material can be dispensed from an automated layup head, which is arranged to apply such material from a roll provided at or on the layup head, the material applied along a linear application plane. The layup head can be moved relative to the mould, to dispense the material along any desired mould portion.

However, while the use of such a layup head can result in faster layup times, the automation of the layup sometimes results in misalignments of fibre-composite material in the mould, in particular when the mould comprises an inclined or sloped mould surface. In such a case, the dispensing of the material from a linear application plane to a curved surface can result in slippage of the fibre-composite material due to the effects of gravity on the material, causing the material to lie off the desired layup path in the mould. The correction of this misalignment can require manual inspection and rectification of the layup material position, thereby introducing additional time and effort to the manufacturing process. In addition, the application of material in a near-vertical alignment can result in a layup head being near a kinematic singularity, meaning that the flexibility or adaptability of the layup head is restricted.

In some systems, tackifier can be applied to the fibre-composite material and/or clamps can be applied to the edges of the material after layup to prevent movement or slippage after layup. However, such systems do not completely eliminate the slippage problem, and/or introduce additional steps to the manufacturing process.

It is an object of the invention to provide an improved system and method for the manufacture of a fibre-composite article which seeks to reduce these problems.

SUMMARY OF THE INVENTION

Accordingly, there is provided a method of manufacturing a fibre-composite article, preferably a portion of a blade for a wind turbine, in a mould having an inclined or curved surface, wherein the method comprises the steps of:
  applying fibre material to said inclined or curved surface of said mould along an inclined application plane, wherein said application plane has a more horizontal orientation relative to said inclined or curved surface of said mould, such that the applied fibre material drops to said inclined or curved surface of said mould, and
  applying resin to said fibre material and curing said resin to form a fibre-composite article.

By dispensing the fibre material along a plane which is oriented more horizontally than the notional plane of the inclined or curved surface, the fibre material will fall under the effect of gravity to the desired location in the mould, effectively Additionally or alternatively, there is provided a method of manufacturing a fibre-composite article in a mould, preferably a portion of a blade for a wind turbine, the fibre-composite article having an inclined or curved surface, the method comprising the steps of:
  providing a mould having a layup plane defined on an inclined or curved surface of said mould, preferably defining a layup plane in said mould, said layup plane arranged to intersect with at least a portion of an inclined or curved surface of said mould to which it is desired to apply a fibre material layer;
  providing a layup head for the dispensing of a fibre material layer, wherein said fibre material layer is dispensed from said layup head along an application plane;
  positioning said layup head wherein said application plane is rotated relative to said layup plane, such that the slope of said layup plane, relative to the horizontal plane, is greater than the slope of said application plane;
  applying at least one fibre material layer from said rotated application plane of said layup head to said layup plane of said mould;
  applying a resin to said at least one fibre material layer in said mould; and
  curing said resin to form a fibre-composite article having an inclined surface.

By arranging the application plane of the layup head to have a smaller angle of incline than the layup plane of the mould, accordingly the risk of misalignment of the fibre layer due to gravity will be reduced. Furthermore, the layup head will be removed from a possible kinematic singularity at relatively high levels of incline. Preferably, the application plane is rotated about the longitudinal or horizontal axis between 5-30 degrees relative to said layup plane, to a more horizontal alignment compared to said layup plane.

It will be understood that the slope of a plane is a measure of the inclination of the plane, and is measured with respect to the horizontal axis. It will further be understood that the slope of said application plane and the slope of said layup plane are measured in the same direction.

Preferably, the method comprises the steps of:
  providing a notional reference layup frame for said layup head for application of fibre material along a surface of said mould, an application plane of said reference layup frame initially provided coincident with said layup plane;

rotating said notional reference layup frame about the longitudinal or horizontal axis such that said application plane has a more horizontal orientation relative to said layup plane; and moving said layup head to be coincident with said rotated layup frame for the application of fibre material from said layup head.

Preferably, the fibre material layer is applied to a layup path defined along a portion of the surface of said mould, the layup path extending along a longitudinal extent of said mould, the layup path having a first longitudinal path edge and a second longitudinal path edge, wherein said first and second path edges are located on said layup plane, and wherein the method comprises the step of:

aligning a first edge of the fibre material layer dispensed from said layup head with said first path edge of said layup path, such that as said at least one fibre material layer is applied from said layup head to said mould, a second edge of said fibre material layer drops to said second path edge of said layup path.

It will be understood that said longitudinal layup path defined on the surface of the mould may comprise a substantially concave surface between said first and second edges. Preferably, the method comprises the step of moving said layup head along a portion of the longitudinal extent of said mould parallel to said layup path, to apply said layer of fibre material to said layup path. It will be understood that the width of the fibre material layer and/or the width of the layup path may vary along the length of the mould.

Preferably, said step of positioning said layup head comprises:

providing a notional reference layup frame for said layup head for application of fibre material along said layup path, an application plane of said reference layup frame initially provided coincident with said layup plane;

rotating said notional reference layup frame about the longitudinal direction of said layup path such that said application plane has a more horizontal orientation relative to said layup plane;

offsetting said rotated frame to locate said first edge of the fibre material layer dispensed from said layup head at said first edge of said layup path to provide a notional translated layup frame;

moving said glass layup head to be coincident with said notional translated layup frame; and subsequently applying fibre material layer along mould based on said notional translated layup frame.

Preferably, said step of rotating comprises rotating said application plane between 5-30 degrees relative to said layup plane.

Additionally or alternatively, said step of rotating said application plane is performed when said layup plane is oriented within 30 degrees of the vertical plane, preferably within 20 degrees of the vertical plane.

By only performing the rotation of the application plane when the layup plane, and the associated layup path, are substantially vertical, the relatively complicated operation of translating the layup head is only performed for those areas of the mould where the effects of gravity and kinematic singularities are greatest.

Preferably, said step of offsetting comprises adjusting the layup head position to account for clearance above the mould.

Preferably, the slope of said layup plane varies along the length of the layup path, and wherein the method comprises the step of adjusting the position of the layup head to vary the slope of said application plane in response to said variation of the slope of the layup plane, as the layup head moves along the length of the layup path.

As the shape of the mould may vary along the mould length, accordingly the layup path and the associated layup plane may vary in inclination. In such a case, it is preferable that the layup head is operable to adjust for such variation, to ensure that the layer of fibre material is accurately applied to the surface of the mould.

Preferably, said step of adjusting the position of the layup head to vary the slope of said application plane comprises the step of when the slope of said layup plane is below a threshold value, said layup head is adjusted such that said application plane is coincident with said layup plane.

If the slope of the layup path and the associated layup plane is decreased to such an extent that the negative effects of gravity on the layer application process is reduced, and/or the angle of the layup path is sufficiently away from a kinematic singularity of the layup head, the layup head may be arranged to follow the layup path without correction or offsetting.

Preferably, the fibre material layer is a glass fibre layer, a carbon fibre layer, or a hybrid glass-carbon fibre layer.

Preferably, the fibre material layer is dispensed from a roll of said fibre material provided on said layup head.

Preferably, the method comprises the step of applying a hot melt adhesive or tackifier in said mould before said step of applying at least one fibre material layer.

Through the use of a suitable hot melt adhesive or tackifier in the mould, the fibre material layer is prevented from slippage inside the mould after application from the layup head. It will be understood that the hot melt or tackifier may be applied directly to the mould surface, and/or may be applied on top of a preceding layer of fibre material applied in the mould. Additionally or alternatively, clamps may be provided to secure the layer of fibre material in position on the mould, as the layer is applied along the length of the layup path.

Preferably, the method comprises the step of applying at least one roller and/or brush to the at least one fibre material layer in the mould after application from the layup head.

By using a roller or brush on top of the fibre material layer after application, the layer can be smoothed to ensure compliance with the mould surface, and/or to bond with hot melt or tackifier provided in the mould. The use of a roller and/or brush on the fibre material layer ensures that a gentle downward pressure is applied to the material layer in the mould, without distortion of the layup path.

Preferably, the method comprises the step of providing said at least one roller and/or brush on said layup head, wherein said at least one roller or brush are downstream from the point of dispensing of said at least one fibre material layer from said layup head.

Providing the at least one roller and/or brush on the layup head downstream from the application point of the fibre material layer ensures that the at least one roller and/or brush are maintained in close alignment with the fibre material layer after dispensing from the layup head.

Preferably, the method comprises the step of providing a fibre material layer or a layup material having a width that varies along the length of the layup path.

Preferably, the method comprises the step of varying the fibre material layer along the length of the layup path, preferably cutting the fibre material layer along the length of the layup path.

There is also provided a method of manufacturing a wind turbine blade comprising:

manufacturing at least one fibre-composite part of a wind turbine blade according to any of the method steps as described above; and assembling said at least one fibre-composite part to form a wind turbine blade.

There is further provided a computer program product adapted to perform the steps of the above method. There is further provided a computer-readable storage medium/data carrier comprising a computer program adapted to perform the method.

Additionally, there is provided a manufacturing system for manufacturing a fibre-composite article in a mould, preferably a portion of a blade for a wind turbine, the system comprising:

a mould to receive a fibre-composite material to form a fibre-composite article, the mould having at least one inclined surface;

an adjustable layup head operable to dispense a fibre material layer in said mould; and a controller operable to control the operation of said layup head, wherein said controller is operable to implement the steps of the above-described method.

There is further provided a fibre-composite article, preferably a portion of a blade for a wind turbine, manufactured according to the above-described method.

DESCRIPTION OF THE INVENTION

An embodiment of the invention will now be described, by way of example only, with reference to the accompanying drawings, which will be understood to be illustrative only, and are not provided to scale.

Figure 1:
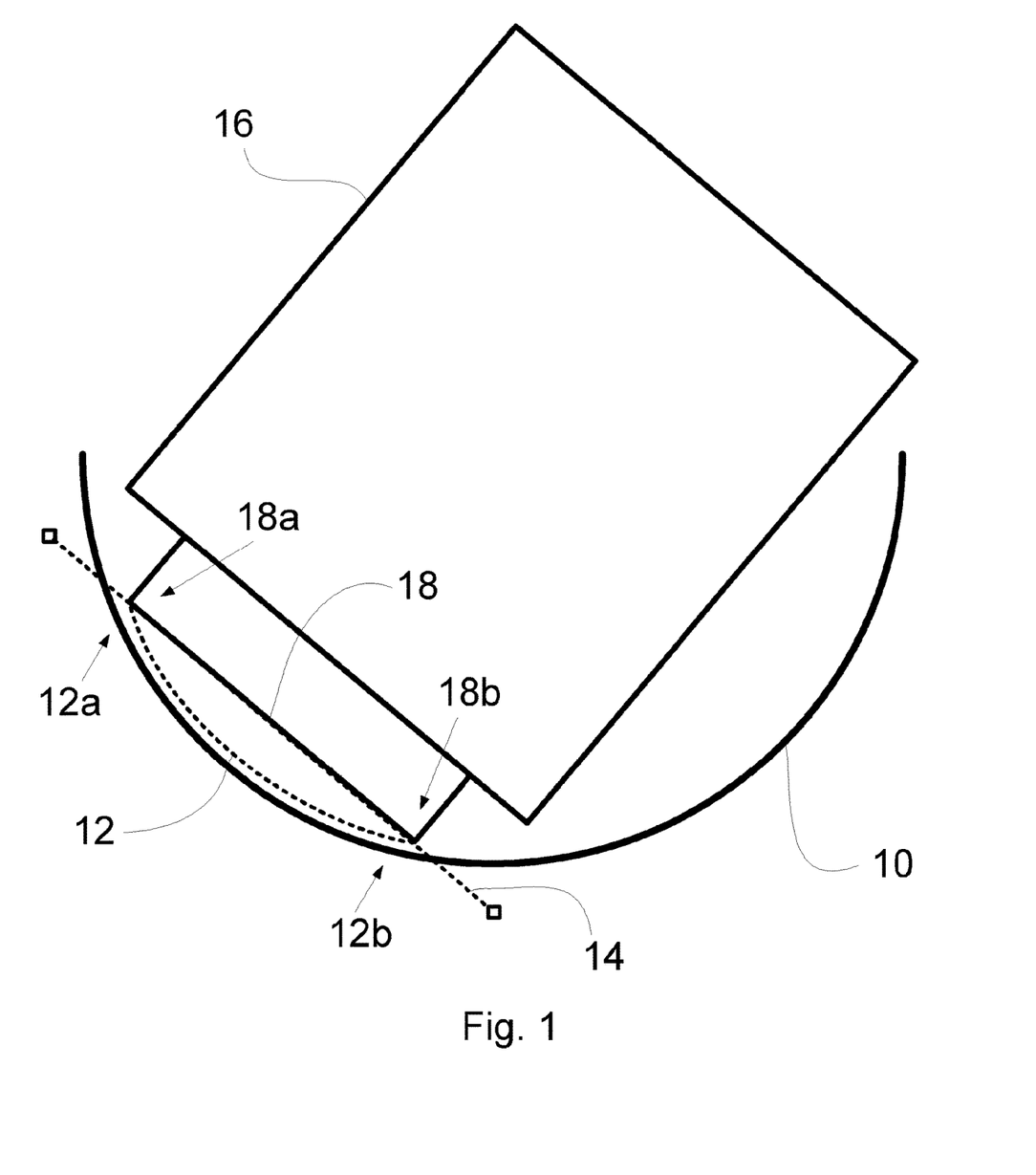
FIG. 1 is a cross-sectional view of a step for a manufacturing method for an article in a mould, for an initial layup of material in the mould along a layup path from a layup head.

FIG. 1 shows a cross-sectional illustrative view of a portion of a system for the manufacturing of an article in a mould 10. The mould 10 comprises a shaped cross-sectional profile having a curved or inclined surface, the mould surface corresponding to the desired profile of the finished article. A layer material, preferably a fibre-composite material, is to be applied to the surface of the mould 10 which can be subsequently cured to form the desired article. The fibre-composite material is applied along layup paths arranged along the longitudinal length of the mould 10.

A layup path 12 is indicated by the dashed line in FIG. 1, the layup path 12 provided along a portion of the curved surface of the mould 10 and extending along the longitudinal direction of the mould 10. The layup path 12 comprises an upper edge 12a and a lower edge 12b, the upper and lower edges 12a, 12b provided on an inclined layup plane 14.

The manufacturing system comprises an articulated layup head 16, which is operable to dispense layers of layup material along an application plane, preferably fibre-composite material. The application plane is indicated at 18, provided along the surface of the layup head 16 from which the material is dispensed. The material is dispensed between a first edge 18a and a second edge 18b of the layup head 16 surface.

It will be understood that the material to be dispensed from the layup head 16 may be provided in roll form, the roll (not shown) mounted on or coupled with said layup head 16. The material may comprise any suitable fibre-composite material, e.g. glass fibres, carbon fibres, etc., in any suitable composition, arrangement and/or dimensions. In one embodiment, the material is Combi 1250 GPV glass fibre, having a thickness of 0.88 mm, and a width of either 400 mm, 600 mm, 800 mm, or 1200 mm.

The layup head 16 is coupled or provided with a controller (not shown) which is operable to control the orientation and translation of the layup head 16 relative to the mould 10. It will be understood that the controller is provided with an indication of the profile of the mould 10. This indication may be pre-defined based on a priori knowledge of the mould profile, e.g. through an initial mapping of the mould profile and/or from a design template setting out the particular dimensions of the mould 10. Additionally or alternatively, the indication may be based on the output of sensors coupled to the controller and arranged to dynamically scan and detect the shape of the mould surface, e.g. vision systems, ultrasonic distance sensors, etc.

In general, the layup head 16 is preferably aligned such that the layup head 16 is arranged adjacent to the layup path 12 in the mould 10, wherein the application plane 18 of the layup head 16 is coincident with the layup plane 14 of the layup path 12.

However, when it is determined that the current or future layup path 12 in the mould 10 is along a curved section of the mould 10, such that an application of a material layer to the layup path 12 from the application plane 18 of the layup head 16 will result in a misalignment of the material layer in the mould 10, the controller is operable to perform a number of corrective steps to the orientation of the layup head 16, to reduce the risk of misalignment of the material layer in the mould 10.

It will be understood that the controller is operable to define a notional reference frame corresponding to the position of the layup head 16, and to apply translation operations to said notional reference frame to provide a resultant reference frame, the ultimate reference frame providing the adjusted orientation for the layup head 16.

Figure 2:
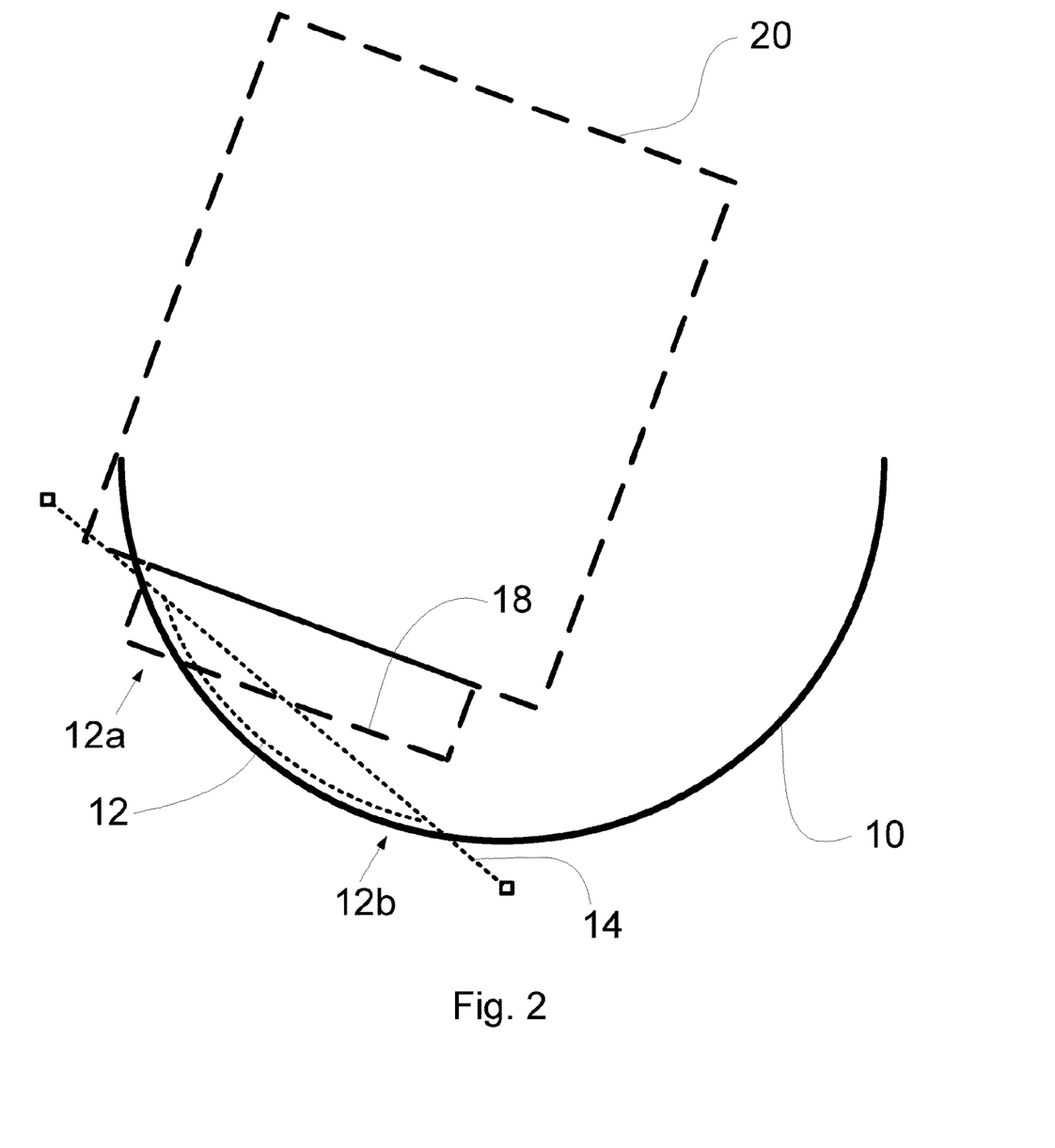
FIG. 2 is a cross-sectional view of the method of FIG. 1, after a rotation of the layup head relative to the layup path.

With reference to FIG. 2, the notional reference frame (indicated by the dashed outline 20) is rotated about the longitudinal direction of the mould 10, about a point corresponding to the midpoint of the layup path 12 between the upper and lower edges 12a, 12b. As a result of the rotation, the application plane 18 defined on the reference frame 20 is orientated in a more horizontal alignment compared to the layup plane 14 of the layup path 12.

The angle of rotation of the reference frame 20 is chosen to provide for an application of material from the application plane 18 of the layup head 16 to the inclined layup path 12 which will not result in a misalignment of the material along the layup path 12. Preferably, the reference frame 20 is rotated between approximately 5-30 degrees relative to said layup plane 14.

Figure 3:
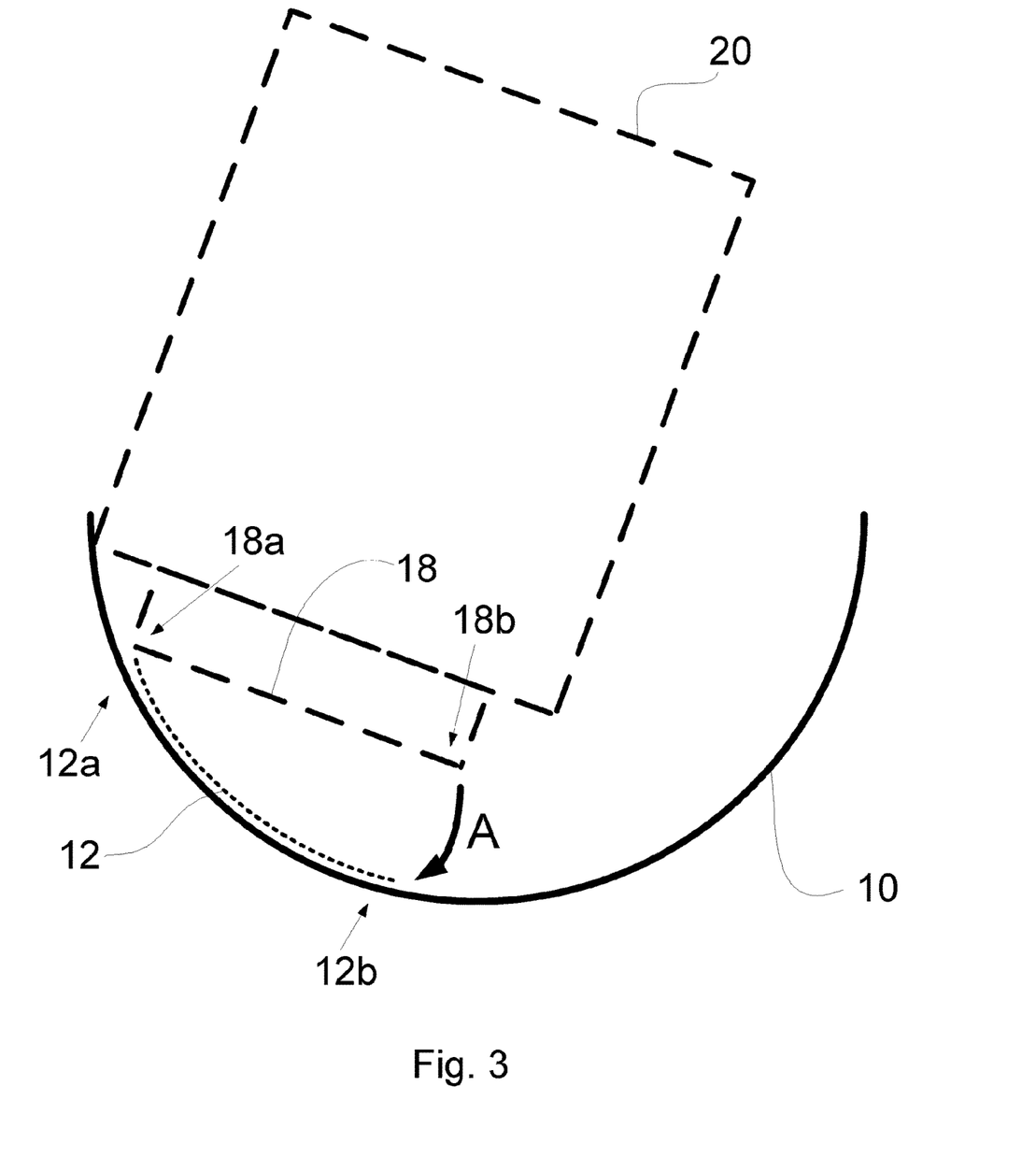
FIG. 3 is a cross-sectional view of the method of FIG. 2, after an alignment of the layup head with an edge of the layup path.

With reference to FIG. 3, the reference frame 20 is then offset, such that the first edge 18a of the application plane 18 defined on the translated reference frame 20 is located in register with the upper edge 12a of the layup path 12. This arrangement should ensure that layup material dispensed from a layup head 16 arranged at said translated reference frame 20 will accurately fall onto the layup path 12 under the effect of gravity. In particular, a first edge of the layup material dispensed from the layup head 16 will be located at the said upper edge 12a of the layup path 12, and an opposed second edge of the layup material will fall from the layup head 16 to land at the said lower edge 12b of the layup path 12, as indicated by arrow A in FIG. 3.

Depending on the interpretation of the boundaries of the translated reference frame 20 with regard to the structure of the mould 10, a further step of offsetting the reference frame 20 may be performed, to provide for adequate clearance of the mould structure by a layup head 16. In such a case, the position of the reference frame 20 is adjusted to ensure that the frame 20 does not overlap with any portion of the mould surface, such that the layup head 16 will by unimpeded by the mould 10 when positioned in the reference frame 20. It will be understood that this step does not need to be carried out if there is no overlap between the mould 10 and the translated reference frame 20.

Figure 4:
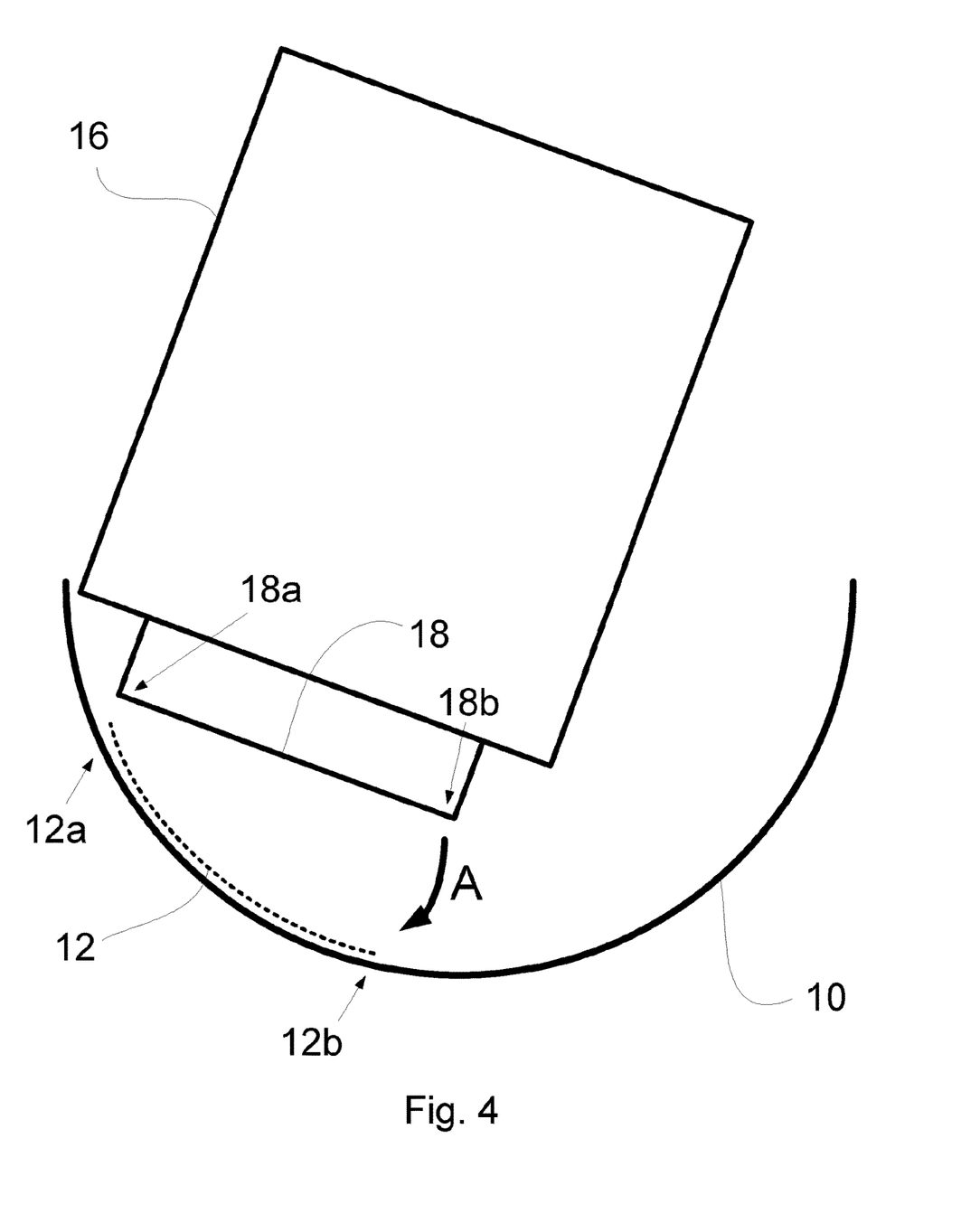
FIG. 4 is a cross-sectional view of the method of FIG. 3, after an offsetting of the layup head to compensate for mould clearance.

With reference to FIG. 4, the layup head 16 is then positioned to align with the reference frame 20, where the application plane 18 of the layup head 16 is orientated in a more horizontal alignment than the layup plane 14. Layup material can now be dispensed from the layup head 16 to the layup path 12 as the layup head 16 is moved along the length of the mould 10. It will be understood that the orientation of the layup head 16 may be dynamically adjusted by the controller as the layup head 16 travels along the length of the mould 10, based on the variation of the slope of the layup plane 14 along the length of the mould 10. This adjustment may be based on the a priori knowledge of the shape of the mould 10, and/or based on the output of various sensor systems coupled to the controller.

The procedure can be repeated for different layers of layup material, and/or for different layup paths provided in the mould 10, having differently-inclined layup planes. Once the layup material has been applied in the mould 10, a resin can be applied to the material, which is subsequently cured to form the desired article, the curved surfaces of the mould 10 imparting the desired profile onto the article.

In a particularly preferred aspect, the system is used to manufacture at least a portion of a blade for a wind turbine, for example a blade shell substantially forming an upwind or a downwind portion of a wind turbine blade. In such an embodiment, it will be understood that the layup procedure may be performed in a plurality of moulds for providing separate portions of the blade, wherein the portions are assembled to form a wind turbine blade after the curing of the individual portions.

In a further aspect of the invention, it will be understood that the width of the layup material may vary along the length of the layup path 12. This may be due to variations of the width of the layup path 12 along the length of the mould 10, for example due to the particular longitudinal profile of the article to be formed by the mould 10. Accordingly, the layup material may be provided in a pre-cut format, having predefined variations in width based on a priori knowledge of the mould 10 geometry. Additionally or alternatively, the layup material may be cut during the application process, based on a priori and/or dynamically monitored knowledge of the mould profile and/or the layup path 12. In these cases, it will be understood that the adjustment of the layup head 16 will be performed to ensure that a first edge of the layup material will be aligned with the upper edge 12a of the layup path 12, following any variation in the width of the layup material.

Figure 5:
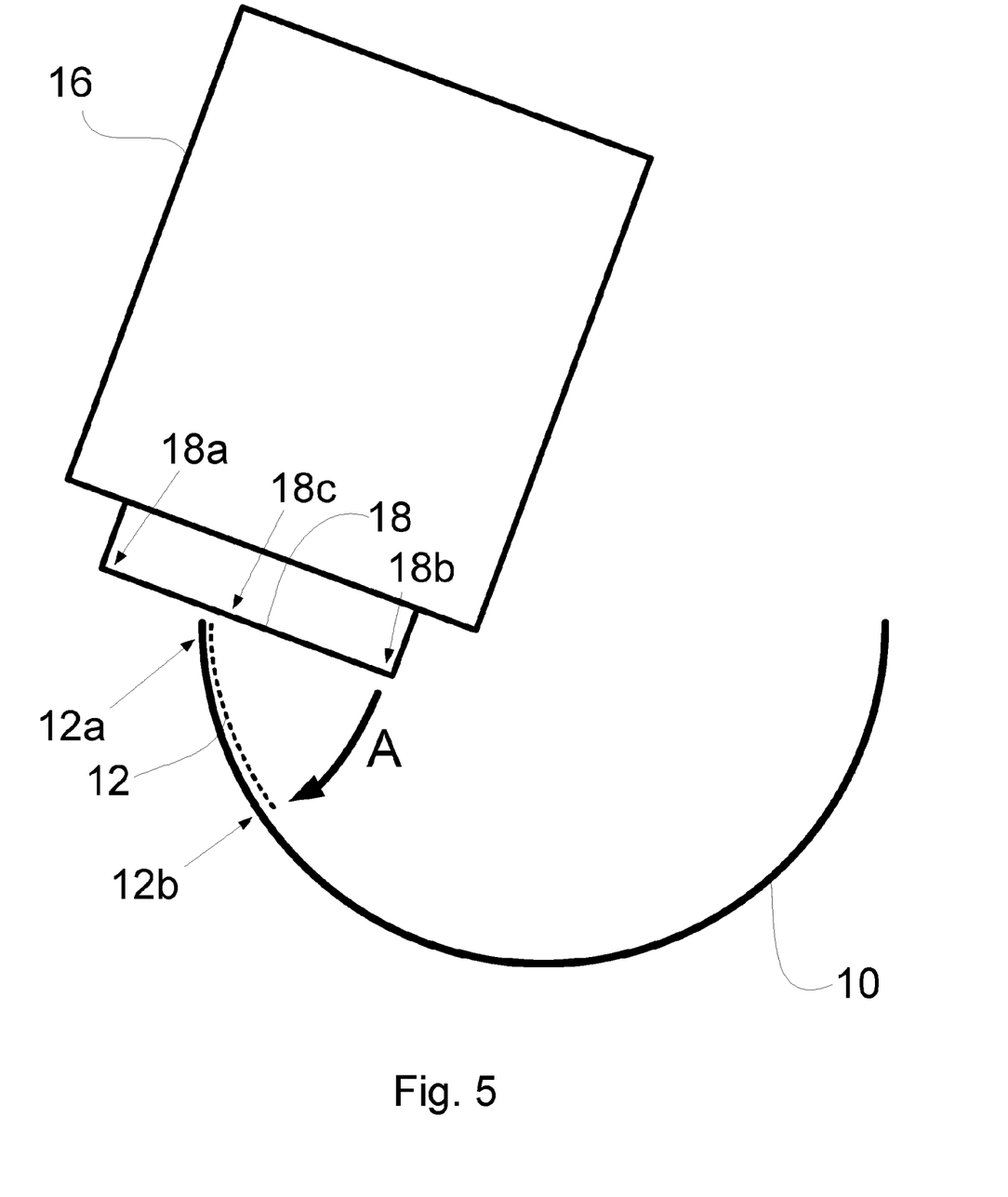
FIG. 5 is a cross-sectional view of the method of the invention, in the application of layup material having reduced width.

With reference to FIG. 5, a layup path 12 of reduced width is defined along an edge of the mould 10. In this case, the layup material to be applied to the layup path 12 does not extend across the entire face of the layup head 16 between the first and second edges 18a, 18b of the application plane 18. Rather, the layup material has a width corresponding to the distance between an edge point 18c and the second edge 18b, defined on the application plane 18. Accordingly, the layup head 16 is arranged as described above, wherein the edge point 18c is aligned with the upper edge 12a of the layup path 12. The layup material is then applied along the layup path 12, wherein the layup material applied from the second edge 18b will fall to the lower edge 12b of the layup path 12, as indicated by arrow A. It will be understood that the location of the edge point 18c between the first and second edges 18a, 18b may vary along the length of the layup path 12. For example, the edge point 18c may start at or towards the first edge 18a, and move towards the second edge 18b as the length along the layup path varies, and vice versa.

It will be understood that the system may comprise the use of tackifiers or hot-melt adhesives in the mould 10, which act to partly hold the layup material in place in the mould and to arrest any slippage of the layup material in the mold 10. Additionally or alternatively, clamps or any other suitable securing mechanisms may be used to further prevent material slippage.

It will be understood that suitable rollers or brushes may be provided at said layup head 16, at a location downstream of the dispensing point of the layup head 16, to ensure that the layup material is applied with some pressure to the surface of the mould 10.

In a preferred aspect, the system is focused such that the layup head 16 may be initially provided wherein the application plane 18 is coincident with the layup plane 14 of the layup path 12, and wherein the above steps of rotation and subsequent offsetting of the layup head 16 are performed only for those sections of the mould 10 wherein the desired layup path 12 is in a substantially vertical alignment, preferably wherein the layup pane 14 of the desired layup path 12 is within 20-30 degrees of the vertical axis. Outside of this range, the gravity and/or singularity effects may be minimised.

It will be understood that the provision of a layup head 16 in a relatively more horizontal alignment compared to the layup plane 14 of the desired layup path 12 both provides for a reduction of the negative effects of gravity on the alignment of the layup material, and distances the layup head 16 from a kinematic singularity.

The invention is not limited to the embodiment described herein, and may be modified or adapted without departing from the scope of the present invention.

The invention claimed is:

1. A method of manufacturing a fibre-composite article, wherein the fibre-composite article has a curved surface, the method comprising the steps of:
    providing a mould having a concave surface;
    defining a layup plane in said mould, said layup plane arranged to intersect at two points with at least a portion of the concave surface of said mould;
    providing a layup head for the dispensing of a fibre material layer, wherein said layup head has an application plane where said fibre material layer is dispensed from said layup head from said application plane;
    positioning said layup head such that said application plane is rotated relative to said layup plane, such that, relative to a horizontal plane, a slope of said layup plane is greater than a slope of said application plane, wherein the positioning of said layup head comprises rotating said application plane about a longitudinal or horizontal axis such that the application plane is rotated along a direction of curvature of the concave surface of said mould;

applying at least one fibre material layer from said rotated application plane of said layup head to said layup plane of said mould, wherein the applied at least one fibre material layer falls under gravity to the concave surface of said mould;

applying a resin to said at least one fibre material layer in said mould; and curing said resin to form a fibre-composite article having a curved surface.

2. The method of claim 1, wherein the rotating of said application plane about the longitudinal or the horizontal axis comprises rotation between 5-30 degrees relative to said layup plane.

3. The method of claim 1, wherein the method comprises the steps of:

providing a notional reference layup frame for said layup head for application of fibre material along a surface of said mould, an application plane of said notional reference layup frame initially provided coincident with said layup plane;

rotating said notional reference layup frame about the longitudinal or horizontal axis such that said application plane has a more horizontal orientation relative to said layup plane; and moving said layup head to be coincident with said rotated notional reference layup frame for the application of fibre material from said layup head.

4. The method of claim 1, wherein the fibre material layer is applied to a layup path defined along a portion of the surface of said mould, the layup path extending along a longitudinal extent of said mould, the layup path having a first longitudinal path edge and a second longitudinal path edge, wherein said first and second longitudinal path edges are located on said layup plane, and wherein the method comprises the step of:

aligning a first edge of the fibre material layer dispensed from said layup head with said first longitudinal path edge of said layup path, such that as said at least one fibre material layer is applied from said layup head to said mould, a second edge of said fibre material layer drops to said second longitudinal path edge of said layup path.

5. The method of claim 4, wherein said step of positioning said layup head comprises:

providing a notional reference layup frame for said layup head for application of fibre material along said layup path, an application plane of said reference layup frame initially provided coincident with said layup plane;

rotating said notional reference layup frame about the longitudinal direction of said layup path such that said application plane has a more horizontal orientation relative to said layup plane;

offsetting the rotated frame to locate said first edge of the fibre material layer dispensed from said layup head at said first edge of said layup path to provide a translated layup frame;

moving said layup head to be coincident with said translated layup frame; and subsequently applying fibre material layer along mould based on said translated layup frame.

6. The method of claim 5, wherein said step of offsetting comprises adjusting the layup head position to account for clearance above the mould.

7. The method of claim 4, wherein the slope of said layup plane varies along the length of the layup path, and wherein the method comprises the step of adjusting the position of the layup head to vary the slope of said application plane in response to said variation of the slope of the layup plane, as the layup head moves along the length of the layup path.

8. The method of claim 7, wherein said step of adjusting the position of the layup head to vary the slope of said application plane comprises the steps of:

comparing said slope of the layup plane relative to the horizontal plane to a threshold value; and adjusting said layup head when the slope of said layup plane relative to the horizontal is below the threshold value, such that said application plane is coincident with said layup plane.

9. The method of claim 8, wherein said threshold value is within 70 degrees of the horizontal plane.

10. The method of claim 1, wherein said step of positioning of said layup head such that said application plane is rotated relative to said layup plane comprises the steps of:

comparing said slope of the layup plane relative to the horizontal plane to a threshold value; and adjusting said layup head when the slope of said layup plane relative to the horizontal plane is above the threshold value.

11. The method of claim 10, wherein said threshold value is above 60 degrees with respect to the horizontal plane.

12. The method of claim 1, wherein the at least one fibre material layer is a glass fibre layer, a carbon fibre layer, or a hybrid glass-carbon fibre layer.

13. The method of claim 1, wherein the at least one fibre material layer is dispensed from a roll of said fibre material provided on said layup head.

14. The method of claim 1, wherein the method comprises the step of applying a hot melt adhesive or tackifier in said mould before said step of applying the at least one fibre material layer.

15. The method of claim 1, wherein the method comprises the step of applying at least one roller or brush to the at least one fibre material layer in the mould after application from the layup head.

16. The method of claim 15, wherein the method comprises the step of providing said at least one roller or brush on said layup head, wherein said at least one roller or brush are downstream from the applying of said at least one fibre material layer from said layup head.

17. A method of manufacturing a wind turbine blade comprising:

manufacturing at least one fibre-composite part of a wind turbine blade according to the method of claim 1; and assembling said at least one fibre-composite part to form a wind turbine blade.

18. The method of claim 9, wherein said threshold value is within 60 degrees of the horizontal plane.

19. The method of claim 11, wherein said threshold value is above 70 degrees with respect to of the horizontal plane.

* * * * *